United States Patent [19]

Fisher

[11] Patent Number: 4,740,068
[45] Date of Patent: Apr. 26, 1988

[54] REARVIEW MIRROR ASSEMBLY WITH MOUNTING ARRANGEMENT INCLUDING INTEGRALLY MOLDED DUAL AXIS PIVOT MEANS

[75] Inventor: Robert J. Fisher, Livonia, Mich.

[73] Assignee: Magna International Inc., Markham, Canada

[21] Appl. No.: 43,399

[22] Filed: Apr. 28, 1987

[51] Int. Cl.[4] ............................ G02B 7/18; B60R 1/06
[52] U.S. Cl. ................................. 350/634; 350/637
[58] Field of Search ............... 350/634, 633, 637, 636; 248/481

[56] References Cited

U.S. PATENT DOCUMENTS 4,403,829  2/1983  Thujiuchi et al. .
4,482,211  4/1984  Fisher .................................. 350/637

FOREIGN PATENT DOCUMENTS 126642  11/1978  Japan .................................. 350/634
172842  10/1982  Japan .................................. 350/634

*Primary Examiner*—Jon W. Henry
*Attorney, Agent, or Firm*—Cushman, Darby & Cushman

[57] ABSTRACT

A rearview mirror assembly including an exteriorly convex shell having a concave interior opening rearwardly when the shell is mounted on the side of a vehicle and a power operated assembly fixedly secured to the shell for mounting and moving a mirror case and mirror assembly for pivotal movement about first and second intersecting pivotal axes normal to one another within the open rear of the shell. The power operated assembly includes a molded plastic member of a size to fit within the concave interior of the shell so as to extend inwardly of and generally across the open rear thereof. The plastic member has spaced portions fixedly secured with spaced portions of the concave interior of the shell so that the molded plastic member serves as a strengthening strut for the open rear of the shell. The plastic member has a dual axis pivot element molded integrally on the central portion thereof which extends rearwardly therefrom and integral first and second surfaces for engaging and supporting one fore and aft half of first and second power operated moving mechanisms respectively of the power operated assembly. The other fore and aft half of the first and second power operated moving mechanisms respectively is supported by a pair of separate substantially identical casing members.

13 Claims, 2 Drawing Sheets

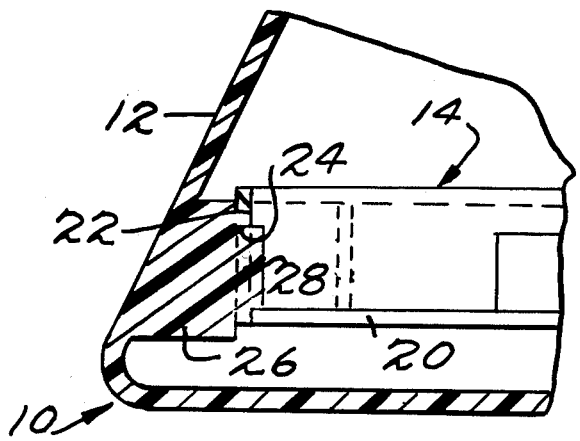
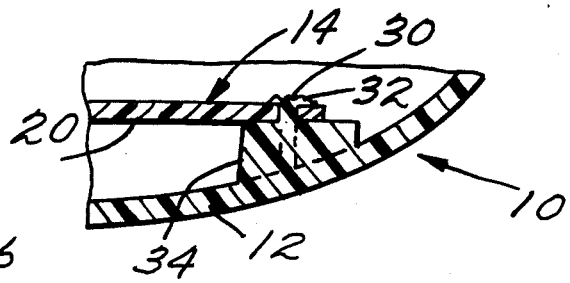
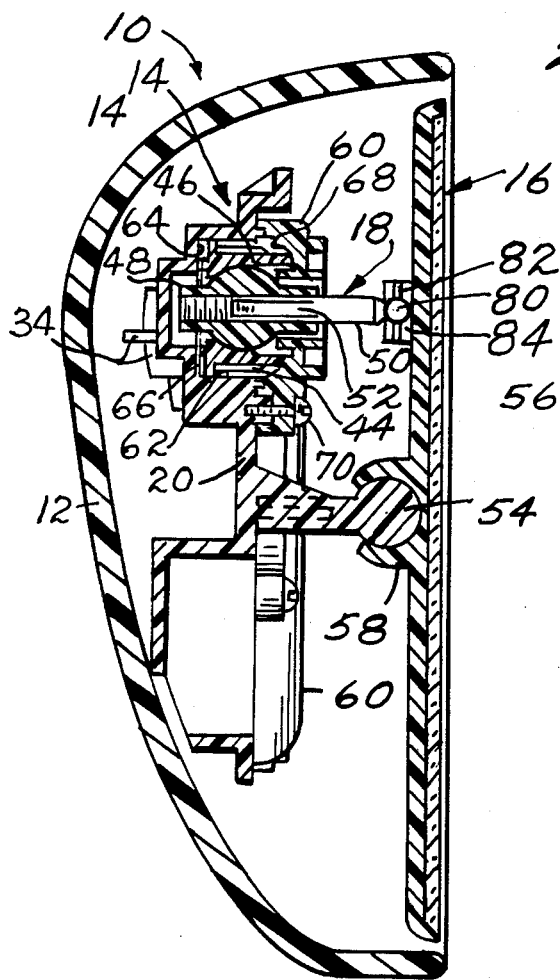
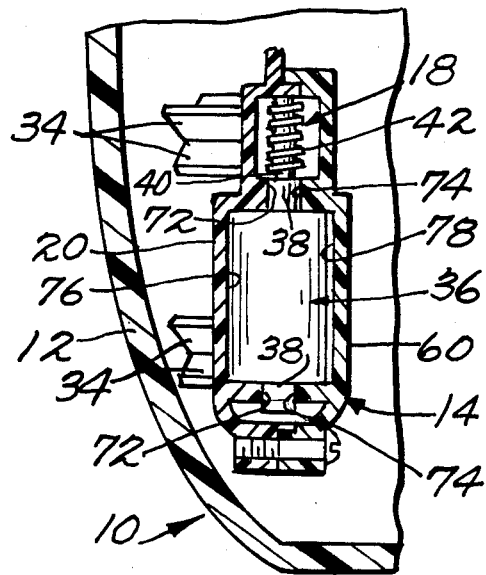

REARVIEW MIRROR ASSEMBLY WITH MOUNTING ARRANGEMENT INCLUDING INTEGRALLY MOLDED DUAL AXIS PIVOT MEANS

This invention relates to rearview mirror assemblies and more particularly to power operated rearview mirror assemblies of the type adapted to be attached to an exterior side of a vehicle.

It is conventional practice in manufacturing rearview mirror assemblies of the type herein contemplated to utilize a unit which is sometimes referred to as a power pack unit. An example of a power pack unit of the type herein contemplated is disclosed in U.S. Pat. No. 4,482,211. The unit fits within the shell of the mirror assembly and is fixed therein by appropriate fasteners. The unit consists of two cooperating housing parts, one of which provides a dual axis pivot for cooperation with the pivot provided by the mirror case so as to mount the mirror case for pivotal movement about first and second intersecting pivotal axes normal to one another. Mounted within the housing parts are first and second power operated moving mechanisms. Each mechanism includes a reversible electric motor and a rearwardly extending motion transmitting member which is movable rearwardly in response to the rotation of the motor in one direction and forwardly in response to the rotation of the motor in the opposite direction. The rearward end of the first motion transmitting member is connected with the mirror case along a first axis in spaced relation to the second axis so that the forward and rearward movements of the first motion transmitting member moves the mirror case in opposite directions about the second axis. The rear end of the second motion transmitting member is connected with the mirror case along the second axis in spaced relation to the first axis so that the forward and rearward movements of the second motion transmitting member moves the mirror case in opposite directions about the first axis.

One of the advantages of providing a unit of this type is that by making the unit sufficiently compact, it could be used in a great variety of mounting shells of different shapes and sizes. It has been found however that particularly where relatively large mounting shells are to be utilized, such as in truck vehicles or the like, the weight and strength of the mounting shell becomes a significant cost factor in the entire assembly. It is desirable therefore to make the shell with a wall thickness which is minimized to thereby minimize material with the resultant savings in cost and weight.

The present invention has for its object improvements in the components of conventional power operated rearview mirror assemblies which will enable the same to operate reliably with minimum material and minimum weight. In accordance with the principles of the present invention, this objective is obtained by eliminating the two-part housing of the conventional power pack and providing in lieu thereof a single molded plastic member of a size to fit within the concave interior of the shell so as to extend inwardly of and generally across the open rear thereof. The molded plastic member is fixedly secured at spaced portions with spaced portions of the concave interior of the shell so that the molded plastic member serves as a strengthening strut for the open rear of the shell. The molded plastic member has integrally molded on the central portion thereof a dual axis pivot element which extends rearwardly therefrom. The molded plastic member has integral first and second surfaces for engaging and supporting one fore and aft half of the first and second power operated moving mechanisms respectively. Finally, a pair of separate substantially identically configured first and second casing members are fixed to the molded plastic member. The first and second casing members have first and second mounting surfaces respectively for engaging and supporting the other fore and aft half of the first and second power operated moving mechanisms respectively. In this way, a range of customized plastic members can be provided to accommodate the full range of shell sizes in such a way that each serves as a strengthening strut for the open rear of the shell thus enabling the same to be formed of less material and less wall thickness. At the same time, the pair of casing members which are substantially identical and hence require less tooling for production can be used with all of the molded plastic members throughout the size range. The result is an efficient use of the material which provides for adequate strength.

Accordingly, another object of the present invention is the provision of a rearview mirror assembly of the type described which is simple in construction, effective in operation, and economical to manufacture.

These and other objects of the present invention will become more apparent during the course of the following detailed description and appended claims.

The invention may best be understood with reference to the accompanying drawings wherein an illustrative embodiment is shown.

In the drawings:

FIG. 2 is an enlarged fragmentary sectional view taken along the line 2—2 of FIG. 1;

FIG. 3 is an enlarged fragmentary sectional view taken along the line 3—3 of FIG. 1;

FIG. 4 is an enlarged fragmentary sectional view of the mirror assembly including the mirror case and mirror taken along the line 4—4 of FIG. 1; and FIG. 5 is an enlarged fragmentary sectional view taken along the line 5—5 of FIG. 1.

Figure 1:
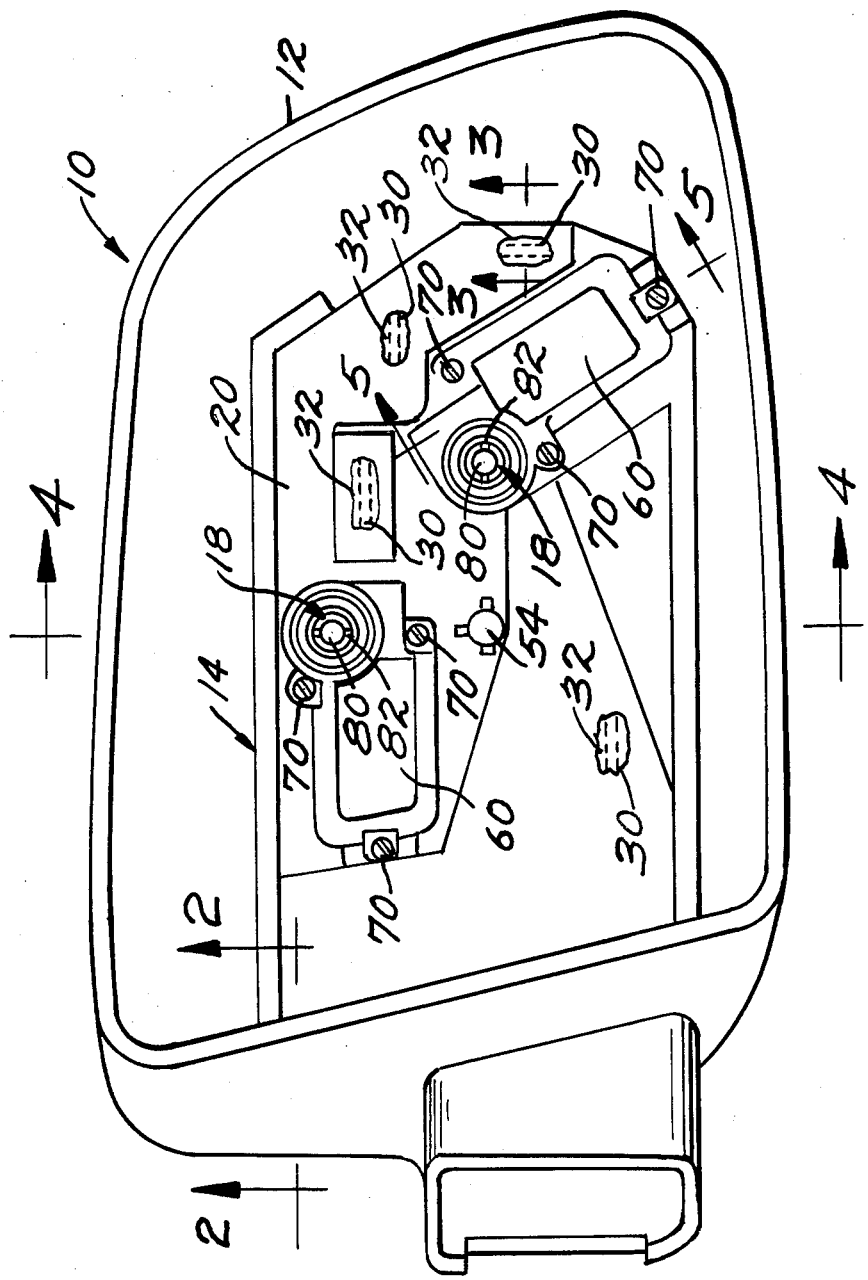
FIG. 1 is a rear elevational view of a rearview mirror assembly embodying the principles of the present invention, with the mirror case and mirror removed for purposes of clear illustration.

Referring now more particularly to the drawings, there is shown therein a rearview mirror assembly, generally indicated at 10, embodying the principles of the present invention which is of the type adapted to be attached to an exterior side of a vehicle. The assembly 10 includes, in general, a mounting shell 12 which is adapted to be connected with the side of the vehicle and to extend laterally outwardly therefrom. The shell 12 is exteriorly convex and interiorly concave and opens rearwardly when mounted in operative position on the vehicle. A power pack assembly, generally indicated at 14, constructed in accordance with the principles of the present invention is fixedly secured within the shell 12 and serves to mount a mirror case and mirror assembly 16 within the open rear of the shell 12 for pivotal movement about first and second intersecting axes normal to one another. The power pack assembly 14 includes first and second power operated moving mechanisms, generally indicated at 18, for moving the mirror case and mirror assembly 16 about the first and second pivotal axes respectively so as to move the same into any desired position of adjustment.

As shown, the power pack assembly 14 includes a main molded plastic member 20 which is of generally thin wall configuration. In accordance with the principles of the present invention, the plastic member 20 is fixedly secured at spaced portions along the periphery thereof with spaced portions of the concave interior of the shell 12. In this way, the plastic member serves as a strengthening strut for the open rear of the shell. While any means for effecting the fixed securement may be utilized; preferably, there is formed on one end of the plastic member 20 a rearwardly extending wall portion 22 having a pair of parallel transversely extending slots 24 formed therein. The shell 12, which also is preferably molded of a plastic material has formed in the interior thereof adjacent the end thereof which is nearest the side of the vehicle, a pair of parallel walls 26 having tongues 28 extending from the free ends thereof, as shown in FIG. 2. The tongues 28 are adapted to extend completely through the slots 24 so that a free end portion thereof is beyond the slots. The thermoplastic material of each tongue 28 is then heated and fused or melted to spread out and engage over the material of the member 20 defining the associated slot 24 thus providing a fixed connection between the plastic member 20 and the shell 12 at that position.

As best shown in FIGS. 1 and 3, additional similar fixed connections are spaced about the periphery of the plastic member 20 and within the shell 12 FIG. 3 illustrates a rearwardly extending slot 30 in an opposite end portion of the member 20 through which a tongue 32 extends. The tongue 32 is formed on one cross of an X-shaped wall 34 integrally formed on the interior of the shell 12. As before, the plastic material of the tongue 32 is melted over to effect a rigid securement. Similar rearwardly extending slots 30 are provided in spaced portions around the periphery of the member 20. As with the connection shown in FIG. 3, the shell 12 is provided with tongues 32 extending through the slots 30, each tongue 32 extending rearwardly from one cross member of an X-shaped wall 34 formed integrally on the interior of the shell 12.

While any known power operated moving mechanism may be utilized in the power pack assembly 14, preferably, each of the power operated moving mechanisms 18 is preferably constructed in accordance with the teachings of U.S. Pat. No. 4,482,211, the disclosure of which is hereby incorporated by reference into the present specification. As best shown in FIG. 5, each power operated moving mechanism 18 includes a reversible electric motor 36 including a housing having a pair of cylindrical bosses 38 extending outwardly from opposed ends thereof. An output shaft 40 extends axially through the bosses and one outwardly extending end of the shaft 40 has a worm gear 42 fixed thereto. The worm gear 42 is adapted to mesh with teeth 44 formed on the exterior of hollow rotary member 46. As best shown in FIG. 4, the rotary member 46 has mounted therein for rotational movement therewith and for limited pivotal movement in one plane with respect thereto an internally threaded nut member 48. A motion transmitting member 50 is mounted within the nut member 48 and is provided with resilient fingers 52 having exterior threads engaging the interior threads of the nut member 48 so as to be moved rearwardly in response to one direction of movement of the motor 36 and forwardly in response to the opposite direction of movement of the motor 36.

In accordance with the principles of the present invention, the main plastic member 20 has formed on the central portion thereof a rearwardly extending dual axis pivot element 54 in the form of a ball. As best shown in FIG. 4, the mirror case and mirror assembly 16 includes a mirror case 56 molded of a suitable plastic material to include a spherical socket 58 of a size to engage on the ball element 54. The ball and socket connection thus provided between the plastic member 20 and the mirror case 56 provides for universal movement including pivotal movement about first and second axes as aforesaid.

Also in accordance with the principles of the present invention, the forward half of each power operated moving mechanism 18 is mounted within the plastic member 20 and the rearward half is mounted within a separate casing member 60. The two casing members 60 are also preferably molded of a suitable plastic material so as to have essentially identical configurations. As best shown in FIG. 4, spaced along the first axis from the second axis there is formed in the plastic member 20 a cylindrical bearing or journal surface 62 having a rearwardly extending axis which intersects with the first axis, which, as shown, is a vertical axis. The cylindrical bearing surface 62 serves to journal a forward half of the rotary member 46 of the associated power operated moving mechanism 18. Extending radially inwardly from the cylindrical surface 62 is a rearwardly facing annual surface 64 against which a sinusoidal spring washer 66 is abutted. The spring washer 64 also engages the forward end of the rotary member 46 and serves to resiliently urge the same rearwardly. The associated casing member 60 is formed with a frustoconical bearing surface 68 within which the forward frustoconical end of the rotary member 46 is journalled when the associated casing member 60 is secured in operative position to the rear of the main plastic member 20, as by bolts 70, as shown in FIG. 4. It will be understood that a second bearing surface 62 and annual surface 64 is provided in the plastic member 20 at a position spaced from the first axis along the second axis which, as shown, is a horizontal axis.

As best shown in FIG. 5, associated with each of the cylindrical surfaces 62 in the main plastic member 20 is a pair of axially spaced rearwardly facing semicylindrical surfaces 72 which are adapted to receive the forward halves of the cylindrical bosses 38 of the associated electrical motor 36. When retained in this position, the worm gear 42 on the end of the output shaft 40 of the motor 36 meshes with the gear teeth 44 on the outer periphery of the rotary member 46 so that the latter rotates in response to the rotation of the electrical motor 36. Each casing member 60 includes abutting surfaces 74 for engaging the bosses 38 to retain the same in accurately located position within the semicylindrical surfaces 72. It will be understood that each motor housing is flattened to engage within flattened cavities 76 and 78 formed in the members 20 and 60 respectively to insure that the motor housing does not turn. As shown in FIG. 4, the rearwardly extending end of each motion transmitting member 50 is formed with a ball element 80 having shaft elements 82 extending radially outwardly therefrom in diametrically opposed relation. The mirror case 56 is formed with a slotted socket 84 for receiving each ball element 80 and associated shaft elements 82. In this way, each motion transmitting member 50 is prevented from rotation by the engagement of the shaft elements 82 within the slots of the sockets 84. Moreover, each member 50 is also capable of pivotal movement at each end by virtue of the ball element 80 and the mounting of the associated nut member 48.

It is believed that the manner in which the present mirror assembly 10 operates will be evident from the above. It will be understood that in accordance with conventional practice, the shell 12 is provided with attaching means (not shown) for attaching the same to the side of a vehicle. The attaching means may be either of the fixed type or of the resilient breakaway type. Moreover, as is usual with rearview mirror assemblies of the power operated type, a control lever mechanism is provided on the dashboard of the vehicle for operating the power operated moving mechanisms 18 by transmitting appropriate electrical currents thereto.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

We claim:

1. In a rearview mirror assembly of the type adapted to be attached to an exterior side of a vehicle, which includes an exteriorly convex shell having a concave interior opening rearwardly when said shell is mounted on the side of a vehicle, a mirror case, mounting means secured to said shell including dual axis pivot means, and means carried by said mirror case in cooperating relation with said dual axis pivot means for mounting said mirror case within the open rear of said shell for pivotal movement about first and second intersecting pivotal axes normal to one another, a first power operated moving mechanism carried by said mounting means including a first reversible electric motor and a first rearwardly extending motion transmitting member movable (1) rearwardly in response to the rotation of said first motor in one direction and (2) forwardly in response to the rotation of said first motor in an opposite direction, means connecting the rearwardly extending end of said first motion transmitting member with said mirror case along said first axis in spaced relation to said second axis so that the forward and rearward movements of said first motion transmitting member moves said mirror case in opposite directions about said second axis, a second power operated moving mechanism carried by said mounting means including a second reversible electric motor and a second rearwardly extending motion transmitting member movable (1) rearwardly in response to the rotation of said second motor in said one direction and (2) forwardly in response to the rotation of said second motor in an opposite direction, means connecting the rearwardly extending end of said second motion transmitting member with said mirror case along said second axis in spaced relation to said first axis so that the forward and rearward movements of said second motion transmitting member moves said mirror case in opposite directions about said first axis, the improvement which comprises said mounting means including a molded plastic member of a size to fit within the concave interior of said shell so as to extend inwardly of and generally across the open rear thereof, means for fixedly securing spaced portions of said molded plastic member with spaced portions of the concave interior of said shell so that said molded plastic member serves as a strengthening strut for the open rear of said shell, said dual axis pivot means including a dual axis pivot element molded integrally on the central portion of said molded plastic member and extending rearwardly therefrom, said molded plastic member having integral first and second one half mounting surface means for engaging and supporting one fore and aft half of said first and second power operated moving mechanisms respectively, and a pair of separate substantially identically configured first and second casing members fixed to said molded plastic member and having first and second other half mounting surface means respectively for engaging and supporting the other fore and aft half of said first and second power operated moving mechanisms respectively.

2. The improvement as defined in claim 1 wherein said first and second motion transmitting members have first and second longitudinal axes respectively, said first and second power operated moving mechanisms including first and second hollow rotary members respectively, said first and second one half mounting surface means including first and second annular surfaces respectively for rotatably supporting one fore and aft half of said first and second rotary members respectively for rotation about first and second rotational axes respectively coinciding with said first and second longitudinal axes when said first and second motion transmitting members are in their midpositions respectively, said first and second other half mounting surface means including first and second annular surfaces respectively for rotatably supporting the other fore and aft half of said first and second rotary members respectively.

3. The improvement as defined in claim 2 wherein said first and second casing members are centrally apertured within the first and second annular surfaces thereof so as to enable the first and second motion transmitting members respectively to extend rearwardly therethrough.

4. The improvement as defined in claim 3 wherein one pair of said first and second annular surfaces is frustoconical and spring means is provided for resiliently urging said first and second rotary members into engagement with said first and second frustoconical surfaces respectively, the other pair of said first and second annular surfaces being cylindrical to accommodate the resilient urging of said first and second rotary members respectively.

5. The improvement as defined in claim 4 wherein said frustoconical surfaces are on said casing members.

6. The improvement as defined in claim 4 wherein said first and second one half mounting surface means includes first and second pairs of axially spaced and axially aligned semi-cylindrical concave surfaces for engaging first and second cylindrical end bosses on said first and second electrical motors, each of said electrical motors having a shaft rotatable about an axis concentric with the axis of the associated cylindrical end bosses.

7. The improvement as defined in claim 6 wherein said fixedly securing means includes spaced tongue and groove connections in which the tongue of each section is formed of thermoplastic material and extends through the associated groove with a free end portion extending therebeyond, the free end portion of each tongue being fused to extend over the associated groove to accomplish the fixed securement.

8. The improvement as defined in claim 2 wherein one pair of said first and second annular surfaces is frustoconical and spring means is provided for resiliently urging said first and second rotary members into engagement with said first and second frustoconical surfaces respectively, the other pair of said first and second annular surfaces being cylindrical to accommodate the resilient urging of said first and second rotary members respectively.

9. The improvement as defined in claim 8 wherein said frustoconical surfaces are on said casing members.

10. The improvement as defined in claim 8 wherein said first and second one half mounting surface means includes first and second pairs of axially spaced and axially aligned semi-cylindrical concave surfaces for engaging first and second cylindrical end bosses on said first and second electrical motors, each of said electrical motors having a shaft rotatable about an axis concentric with the axis of the associated cylindrical end bosses.

11. The improvement as defined in claim 10 wherein said fixedly securing means includes spaced tongue and groove connections in which the tongue of each section is formed of thermoplastic material and extends through the associated groove with a free end portion extending therebeyond, the free end portion of each tongue being fused to extend over the associated groove to accomplish the fixed securement.

12. The improvement as defined in claim 1 wherein said first and second one half mounting surface means includes first and second pairs of axially spaced and axially aligned semi-cylindrical concave surfaces for engaging first and second cylindrical end bosses on said first and second electrical motors, each of said electrical motors having a shaft rotatable about an axis concentric with the axis of the associated cylindrical end bosses.

13. The improvement as defined in claim 1 wherein said fixedly securing means includes spaced tongue and groove connections in which the tongue of each section is formed of thermoplastic material and extends through the associated groove with a free end portion extending therebeyond, the free end portion of each tongue being fused to extend over the associated groove to accomplish the fixed securement.

* * * * *